United States Patent
Zhang et al.

(10) Patent No.: US 10,958,100 B2
(45) Date of Patent: Mar. 23, 2021

(54) SWITCHED MODE POWER SUPPLIES WITH CONFIGURABLE COMMUNICATION ADDRESSES

(71) Applicant: Astec International Limited, Kwun Tong (HK)

(72) Inventors: Bing Zhang, Shenzhen (CN); Mei Qin, Shenzhen (CN); Lian Liang, Shenzhen (CN); Wenyong Liu, Shenzhen (CN); Zhishuo Li, Shenzhen (CN)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 16/473,486

(22) PCT Filed: Dec. 3, 2018

(86) PCT No.: PCT/CN2018/119001
§ 371 (c)(1),
(2) Date: Jun. 25, 2019

(87) PCT Pub. No.: WO2020/113389
PCT Pub. Date: Jun. 11, 2020

(65) Prior Publication Data
US 2020/0177024 A1 Jun. 4, 2020

(51) Int. Cl.
*H02J 13/00* (2006.01)
*G06F 13/42* (2006.01)

(52) U.S. Cl.
CPC ........ *H02J 13/00006* (2020.01); *G06F 13/42* (2013.01)

(58) Field of Classification Search
CPC ........... H02J 13/00006; H02J 13/00007; H02J 13/00009; H02J 13/0001;
(Continued)

(56) References Cited

U.S. PATENT DOCUMENTS

2006/0284596 A1* 12/2006 Albers ................ G06F 13/4027
320/116
2007/0083582 A1* 4/2007 Chambers ........... G06F 13/4213
708/490
(Continued)

FOREIGN PATENT DOCUMENTS

CN 101765836 A 6/2010
CN 103176418 A 6/2013
(Continued)

OTHER PUBLICATIONS

Michael Jones, Power System Management Addressing, Linear Technology, Jul. 2016, 8 pages.

*Primary Examiner* — Patrick C Chen

(57) ABSTRACT

A switched mode power supply includes a communication interface and an address terminal for setting a communication address for the power supply using the resistance of an external resistor when the external resistor is coupled to the address terminal. The power supply is configured to determine a first resistance value for the external resistor using a first technique, determine a second resistance value for the external resistor using a second technique, set the communication address of the power supply using the first resistance value if the first resistance value is greater than a threshold value, and set the communication address of the power supply using the second resistance value if the first resistance value is less than the threshold value. Other example switched mode power supplies, power systems including one or more power supplies, and methods for setting a communication address of a power supply are also disclosed.

14 Claims, 5 Drawing Sheets

(58) Field of Classification Search
CPC .... H02J 13/00012–00018; H02J 13/00; G06F 13/42; G06F 13/4204–4295
See application file for complete search history.

(56) References Cited

U.S. PATENT DOCUMENTS

| | | | |
|---|---|---|---|
| 2009/0031048 A1* | 1/2009 | Richards | G06F 13/4072 710/3 |
| 2011/0055442 A1* | 3/2011 | Ward | G05B 19/0421 710/110 |
| 2016/0357665 A1* | 12/2016 | Lee | G06F 3/0653 |

FOREIGN PATENT DOCUMENTS

| | | |
|---|---|---|
| CN | 105718414 A | 6/2016 |
| CN | 106068504 A | 11/2016 |
| CN | 108897708 A | 11/2018 |
| DE | 102008044777 A1 | 3/2010 |

\* cited by examiner

SWITCHED MODE POWER SUPPLIES WITH CONFIGURABLE COMMUNICATION ADDRESSES

FIELD

The present disclosure relates to switched mode power supplies with configurable communication addresses.

BACKGROUND

This section provides background information related to the present disclosure which is not necessarily prior art.

Some power supply modules include unique communication addresses for communicating with an external controller. This may allow each power supply module to communicate (e.g., via a Power Management Bus (PMBus) protocol, etc.) with the external controller and other power supply modules. Each power supply module may use a resistor and a particular address-setting technique to set its unique communication address. The address-setting technique may be a constant current technique in which the power supply module calculates the value of the resistor based on a constant current provided to the resistor and sets the communication address based on the calculated resistor value. Alternatively, the address-setting technique may be a voltage divider technique in which the power supply module calculates the value of the resistor using a voltage divider circuit and sets the communication address based on the calculated resistor value.

SUMMARY

This section provides a general summary of the disclosure, and is not a comprehensive disclosure of its full scope or all of its features.

According to one aspect of the present disclosure, a switched mode power supply for communicating with a master controller of a power system. The switched mode power supply includes an input, an output, a power circuit coupled between the input and the output, a communication interface having an address terminal configured to couple to an external resistor for setting a communication address of the switched mode power supply when the external resistor is coupled to the address terminal, and a control circuit coupled to the power circuit and the communication interface. The control circuit is configured to set the communication address of the switched mode power supply using a first technique if a value of the external resistor is greater than a threshold value and to set the communication address of the switched mode power supply using a second technique if the value of the external resistor is less than the threshold value.

According to another aspect of the present disclosure, a method for setting a communication address of a switched mode power supply for communicating with a master controller is disclosed. The switched mode power supply includes a communication interface having at least one address terminal coupled to an external resistor. The method includes setting the communication address of the switched mode power supply with a first technique if a value of the external resistor is greater than a threshold value, and setting the communication address of the switched mode power supply with a second technique if the value of the external resistor is less than the threshold value.

According to another aspect of the present disclosure, a switched mode power supply includes a communication interface and an address terminal for setting a communication address for the switched mode power supply using the resistance of an external resistor when the external resistor is coupled to the address terminal. The switched mode power supply is configured to determine a first resistance value for the external resistor using a first technique, determine a second resistance value for the external resistor using a second technique, set the communication address of the switched mode power supply using the first resistance value if the first resistance value is greater than a threshold value, and set the communication address of the switched mode power supply using the second resistance value if the first resistance value is less than the threshold value.

According to another aspect of the present disclosure, a method for setting a communication address of a switched mode power supply for communicating with a master controller is disclosed. The switched mode power supply includes a communication interface and an address terminal coupled to an external resistor. The method includes determining a first resistance value for the external resistor using a first technique, determining a second resistance value for the external resistor using a second technique, setting the communication address of the switched mode power supply using the first resistance value if the first resistance value is greater than a threshold value, and setting the communication address of the switched mode power supply using the second resistance value if the first resistance value is less than the threshold value.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts and/or features throughout the several views of the drawings.

DETAILED DESCRIPTION

Figure 1:
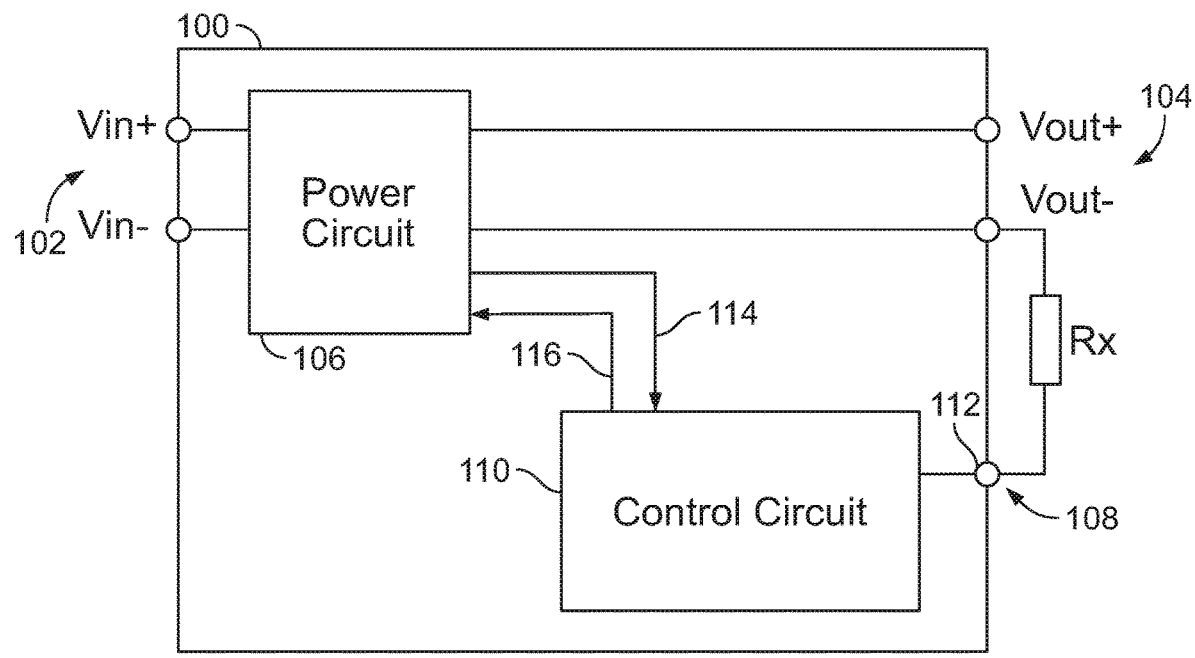
FIG. 1 is a block diagram of a power supply including a control circuit for setting an address of the power supply using different techniques based on a value of an external address-setting resistor, according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

Example methods of setting a communication address of a power supply for communicating with a master controller are disclosed herein. The power supply includes a communication interface and an address terminal coupled to an external resistor. The methods may include using two different techniques for determining the resistance value of the external resistor, and then setting the communication address using the resistance value determined with the desired technique. For example, the methods may include determining a resistance value for the external resistor using one technique, determining a resistance value for the external resistor using another technique, setting the communication address using the resistance value determined using the former technique if the resistance value is greater than a threshold value, and setting the communication address using the resistance value determined using the latter technique if the resistance value is less than the threshold value.

By employing two different techniques to determine the external resistance value and set the communication address, the power supply may set its communication address with greater reliability and accuracy as compared to a conventional power supply using a single technique to determine its external resistance value and set the communication address. For example, a conventional power supply employing a single address-setting technique may be susceptible to noise, require a small range of discrete resistance values (corresponding to the communication addresses) with little differences between adjacent resistance values, etc. For instance, low voltages are susceptible to noise. As such, when the external resistance value is determined based on a low voltage across the external resistor, noise may distort the determined resistance value and cause inaccuracies in setting the address. Additionally, voltages used to determine resistance values of different external resistors coupled to different power supplies may have minor differences for the different power supplies. In such cases, a small range of discrete resistance values (with little differences between adjacent resistance values) is used based on these relatively similar voltages. This small range of discrete resistance values leads to inaccuracies when setting communication addresses for different power supplies.

However, by using different address-setting techniques based on the determined external resistance value, the number of available configurable communication addresses for the power supply may be increased as compared to a conventional power supply. This is because a wide range of resistance values with large differences between adjacent values is made possible by selecting the appropriate address-setting technique to use (as further explained below). Additionally, due to the wide range of resistance values, the reliability of setting the appropriate configurable address when using different address-setting techniques is increased as compared to a conventional power supply employing one address-setting technique.

The techniques may utilize different circuitry for determining the external resistance value. For example, one technique may be tailored to higher external resistance values and the other technique may be tailored to lower external resistance values. In such examples, the technique tailored to higher resistance values may allow for large differences between adjacent resistance values to minimize (and sometimes eliminate) noise distortion issues. Additionally, the technique tailored to lower resistance values may allow for large differences between voltages used in determining the values of resistors coupled to different power supplies. As such, large differences between adjacent resistance values for setting communication addresses may be employed.

These selectable techniques may be employed in one or more power supplies of a power system. For example, different addresses may correspond to different resistance values. As such, a value of one external resistor coupled to one power supply may correspond to one unique communication address, and a value of another resistor coupled another power supply in the power system may correspond to another unique communication address.

The methods disclosed herein may be implemented in a wide variety of power supplies including, for example, switched mode power supplies. These power supplies may include one or more power circuits having one or more power switches as further explained below. Some example power supplies are described below with reference to FIGS. 1-11. It should be understood, however, that the teachings of this disclosure are not limited to the particular examples shown in FIGS. 1-11, and can be applied to a wide variety of other power supplies or the like.

For example, a switched mode power supply according to one example embodiment of the present disclosure is illustrated in FIG. 1 and indicated generally by reference number 100. As shown in FIG. 1, the power supply 100 includes a communication interface 108 and an address terminal 112 for setting a communication address for the power supply 100 using the resistance of an external resistor Rx coupled to the address terminal 112. In particular, and as shown in FIG. 1, the switched mode power supply 100 includes an input 102, an output 104, a power circuit 106 coupled between the input 102 and the output 104, the communication interface 108 (with the address terminal 112) and a control circuit 110 coupled to the power circuit 106 and the communication interface 108. The power supply 100 determines a resistance value for the external resistor Rx using one technique, determines another resistance value for the external resistor Rx using another technique, sets the communication address of the power supply 100 using the resistance value determined using the former technique if the resistance value is greater than a threshold value (e.g. a defined threshold value, etc.), and sets the communication address using the resistance value determined using the latter technique if the resistance value is less than the threshold value.

The power supply 100 of FIG. 1 may receive an AC or DC voltage and current, and output an AC or DC voltage and current to a load. As shown in FIG. 1, the input 102 includes electrical terminals Vin+, Vin− coupled to the power circuit 106, and the output 104 includes electrical terminals Vout+, Vout−. The electrical terminals Vin+, Vout+ may represent a DC power terminals, and the electrical terminals Vin−, Vout− may represent DC reference (e.g., ground) terminals. In other embodiments, the electrical terminals may represent AC line terminals and AC neutral terminals.

In the particular example of FIG. 1, the communication interface 108 includes a single address terminal 112 for coupling to the resistor Rx. Specifically, the resistor Rx is coupled between the address terminal 112 and the electrical terminal Vout− of the power output 104. In such examples, the address terminal 112 may be the only terminal in the communication interface 108. In other examples, the communication interface 108 may include more than one address terminal for coupling to the resistor Rx and/or other components for communication purposes.

As shown in FIG. 1, the control circuit 110 is in communication with the power circuit 106. For example, the control circuit 110 receives one or more signals 114 from the power circuit 106 and provides one or more control signals 116 to the power circuit 106. The signals 114 may represent one or more sensed (e.g., sampled) parameters such as the output voltage and/or current, input voltage and/or current, etc. The control signals 116 (e.g. PWM signals, etc.) may be generated based on the received signals 114 for controlling one or more power switches (not shown) in the power circuit 106.

Figure 2:
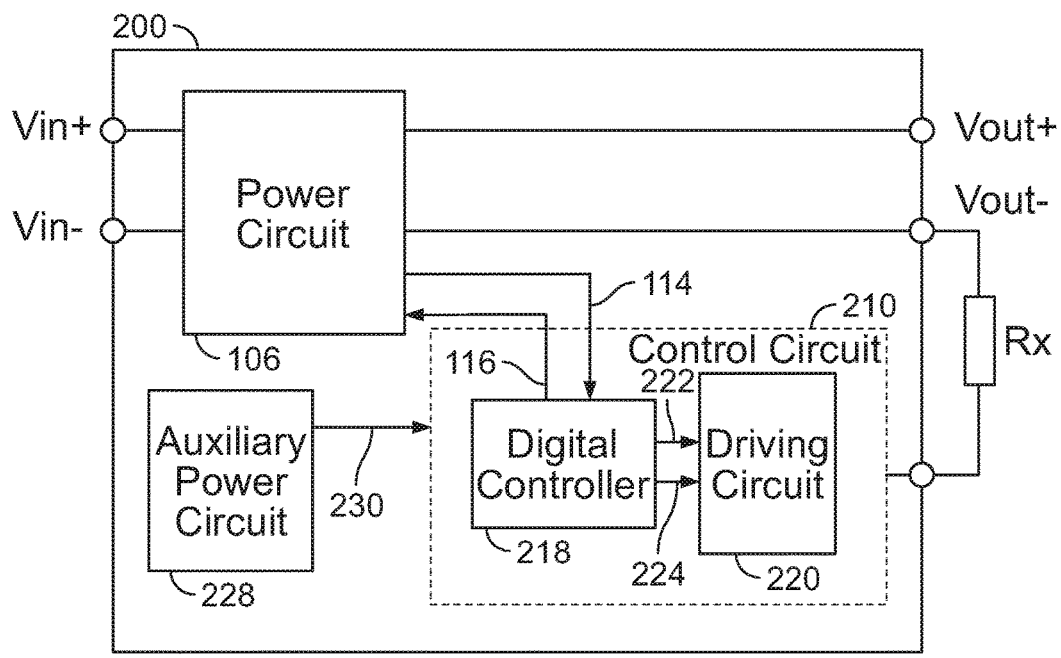
FIG. 2 is a block diagram of a power supply including a control circuit having a digital controller and a driving circuit for setting an address of the power supply according to another example embodiment.

The control circuit 110 may be powered by the power circuit 106 or another power source. For example, FIG. 2 illustrates a switched mode power supply 200 including the power circuit 106 of FIG. 1, a control circuit 210 and an auxiliary power circuit 228 for powering the control circuit 210 via a power signal 230. The auxiliary power circuit 228 may receive input power from the power circuit 106 and convert (if necessary) that power into a desired output power for the control circuit 210. In other examples, the auxiliary power circuit 228 may receive input power from another source such as a battery, etc.

In some examples, the control circuits disclosed herein may select one of the techniques for setting the communication address. For instance, the control circuit 210 of FIG. 2 may select a particular technique for setting a communication address of the power supply 200. For example, the control circuit 210 includes a digital controller 218 and a driving circuit 220 coupled to the digital controller 218. The digital controller 218 provides signals 222, 224 to the driving circuit 220. These signals 222, 224 may assist in selecting a particular technique for setting a communication address of the power supply 200 and provide power to the driving circuit 220.

The digital controller 218 may function as the main controller of the power supply 200. For example, the digital controller 218 may receive the signals 114 from the power circuit 106 and provide the control signals 116 to the power circuit 106 as shown in FIG. 2.

Figure 3:
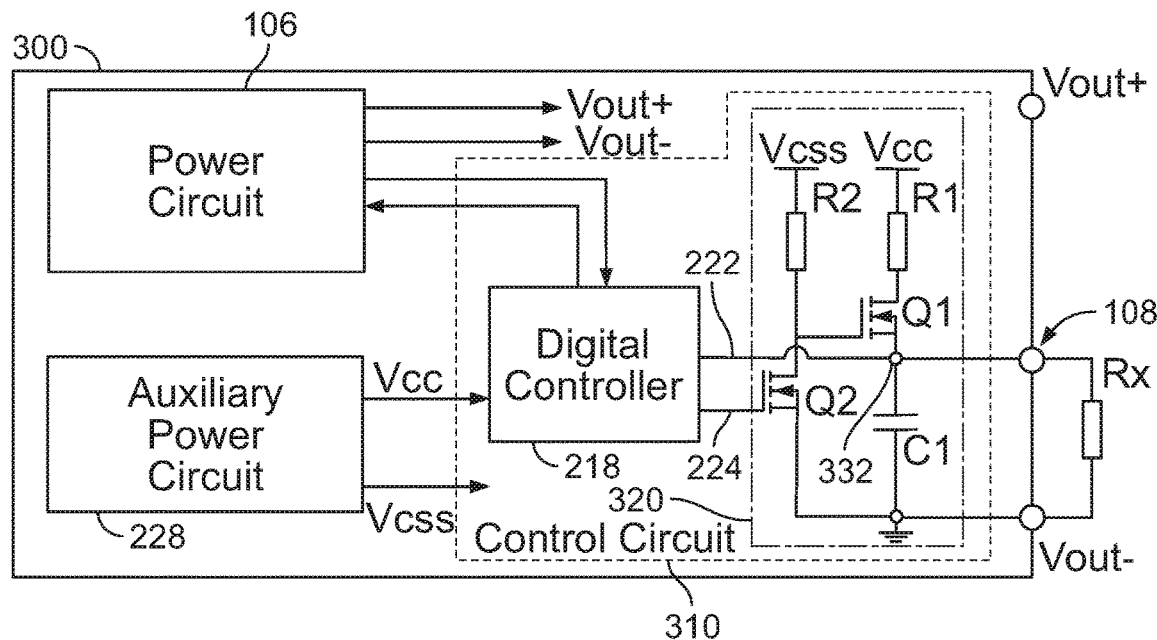
FIG. 3 is a circuit block diagram of a power supply including a control circuit with a driving circuit having switching devices for selecting different techniques to set an address of the power supply according to yet another example embodiment.

In some examples, the driving circuit 220 may include one or more components to select the desired technique based on the value of the resistor Rx (as explained herein). The components may include one or more switching devices, resistors, capacitors, etc. For example, FIG. 3 illustrates a switched mode power supply 300 including a driving circuit 320 having various electrical components for assisting in selecting the desired technique. Specifically, the power supply 300 includes the power circuit 106 of FIG. 1 providing power to the electrical terminal Vout+ (e.g., a power output) and the electrical terminal Vout− (e.g., a reference voltage such as ground), the communication interface 108 of FIG. 1, the auxiliary power circuit 228 of FIG.

2, and a control circuit 310 including the digital controller 218 of FIG. 2 and the driving circuit 320.

As shown in FIG. 3, the driving circuit 320 includes two switching devices Q1, Q2, two resistors R1, R2 and a capacitor C1. The switching device Q1 is coupled to the resistor R1 on one side (e.g., the drain) and the capacitor C1 on the other side (e.g., the source), and the switching device Q2 is coupled to the resistor R2 on one side (e.g., the drain) and the electrical terminal Vout− on the other side (e.g., the source). The capacitor C1 is coupled between the switching device Q1 and the electrical terminal Vout−. The capacitor C1, the switching device Q1 (e.g., the source of the switching device Q1) and the address terminal 112 are coupled together at a node 332. Each resistor R1, R2 may have a fixed resistance value.

The resistor Rx is used for setting a communication address of the power supply 300. This allows the power supply 300 to communicate with a master controller (not shown) in a master/slave relationship, as explained herein. As shown, the resistor Rx is coupled across the address terminal 112 and the electrical terminal Vout−. For example, the resistor Rx is coupled in parallel with the capacitor C1.

As shown in FIG. 3, the auxiliary power circuit 228 provides voltages Vcc, Vcss to the control circuit 310. Specifically, the voltage Vcc is provided to the digital controller 218 and the resistor R1 in the driving circuit 320, and the voltage Vcss is provided to the resistor R2 in the driving circuit 320. In some examples, the voltage Vcss may be greater than the voltage Vcc.

In the particular example of FIG. 3, two techniques are available for setting the address of the power supply 300. Specifically, the control circuit 310 may use a constant current technique and a voltage divider technique depending on the value of the resistor Rx (as explained herein). In other embodiments, other suitable address-setting techniques may be employed if desired.

The control circuit 310 may select the constant current technique or the voltage divider technique by controlling the switch devices Q1, Q2. For example, the gate of the switching device Q2 is coupled to the digital controller 218 for receiving the control signal 224, and the gate of the switching device Q1 is coupled between the resistor R2 and the switching device Q2. The switching devices Q1, Q2 are controlled in a complementary manner.

Figure 4:
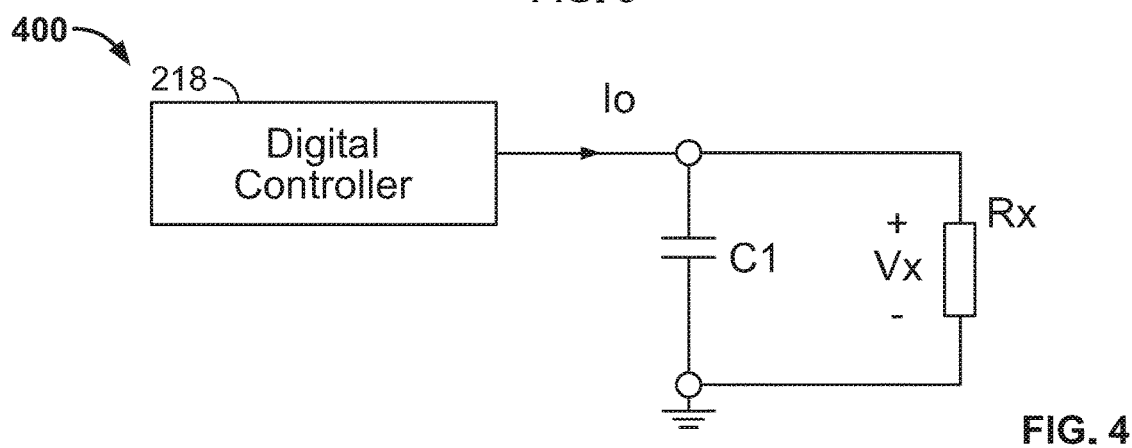
FIG. 4 is an equivalent circuit of the control circuit of FIG. 3 when using one technique to set an address of the power supply.

For instance, when the switching device Q2 is controlled to turn on (e.g., the control signal 224 is high), the gate voltage of the switch device Q1 is pulled down due to current flowing through the switching device Q2 to the reference voltage. This causes the switching device Q1 to turn off. As such, the state of the switching device Q1 is based on the state of the switching device Q2. FIG. 4 illustrates an equivalent circuit 400 of the control circuit 310 and the resistor Rx when the switch device Q2 is closed and the switch device Q1 is open.

During this time, the control circuit 310 employs the constant current technique. For example, when the switching device Q2 is on, the control circuit 310 outputs a constant current to the resistor Rx. Specifically, the digital controller 218 outputs a generated constant current (e.g., the signal 222) that passes through the node 332 and to the resistor Rx and the capacitor C1. This is shown as output current Io in FIG. 4. The control circuit 310 may then sense (e.g., sample, etc.) a voltage Vx across the resistor Rx based on the generated constant current Io, and determine (e.g., calculate, etc.) the value of the resistor Rx based on the sensed voltage Vx. For example, the value of the resistor Rx is equal to the sensed voltage Vx divided by the output current Io.

Figure 5:
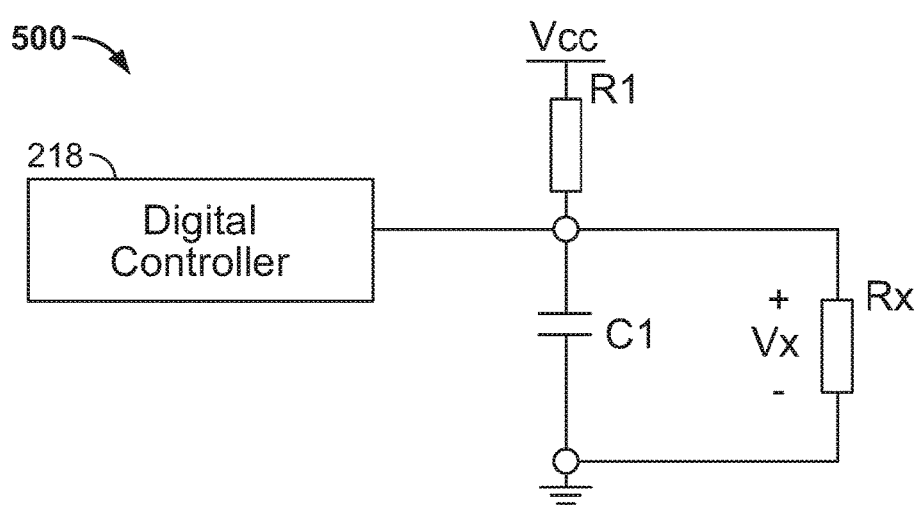
FIG. 5 is an equivalent circuit of the control circuit of FIG. 3 when using another technique set an address of the power supply.

However, when the switching device Q2 is off, the gate voltage of the switching device Q1 is pulled up based on the power signal Vcss causing the switching device Q1 to turn on. When the switching device Q1 is on, the resistor R1 (e.g., having a fixed resistance) is coupled to the resistor Rx (e.g., external resistor) to form a voltage divider circuit. Therefore, when the switching device Q1 is on (and the switching device Q2 is off), the control circuit 310 employs the voltage divider technique. FIG. 5 illustrates an equivalent circuit 500 of the control circuit 310 and the resistor Rx when the switch device Q2 is open and the switch device Q1 is closed.

During this time, the control circuit 310 may sense the voltage Vx across the resistor Rx based on the proportional divider circuitry of the resistors R1, Rx, and then determine the value of the resistor Rx based on the value of the resistor R1, the sensed voltage Vx and the voltage Vcc. For example, equation (1) below is a conventional voltage divider equation solving for the voltage Vx (e.g., an output voltage), and equation (2) below solves for the unknown value of the resistor Rx shown in equation (1).

$$Vx = \frac{Rx}{Rx + R1} * Vcc \quad (1)$$

$$Rx = \frac{Vx * R1}{Vcc - Vx} \quad (2)$$

Figures 6, 7:
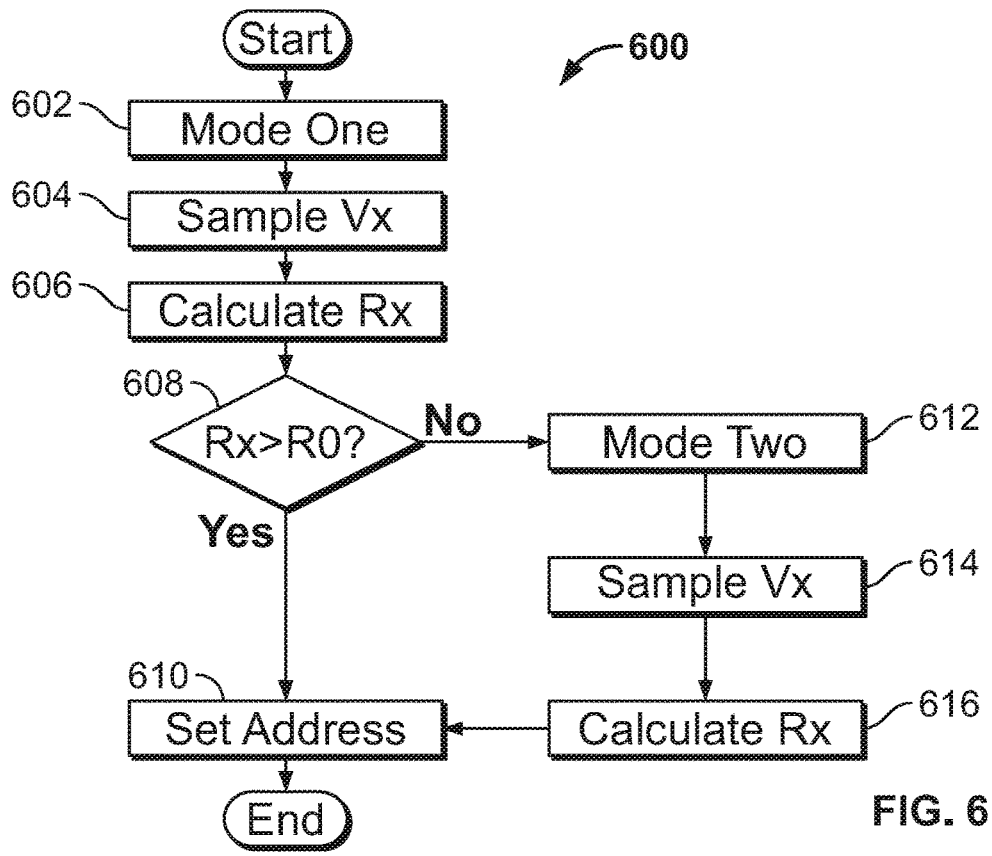
FIG. 6 is a flow chart of a method for setting an address of the power supply of FIG. 3 according to another example embodiment.
FIG. 7 is a chart of a lookup table listing different address-setting resistor values and corresponding addresses according to yet another example embodiment.

FIG. 6 illustrates a method 600 for setting a configurable communication address of the power supply 300 of FIG. 3. Although specific references are made to the power supply 300 of FIG. 3 in relation to the method 600, it should be apparent that any of the power supplies disclosed herein may employ the method 600 to set a communication address.

After startup (e.g., power on) of the power supply 300, the control circuit 310 is set to operate in one technique (e.g., a default technique) such as the constant current technique as explained above. This is shown in block 602. For example, the digital controller 218 may control the switching device Q2 to turn on, thereby causing the switching device Q1 to turn off as explained above. During this time, the digital controller 218 generates and provides a constant current to the resistor Rx as explained above.

The value of the voltage Vx across the resistor Rx is then obtained by sampling in block 604. For example, the digital controller 218 may include an A/D sampling port for sampling the voltage Vx. This sampling port may also output the constant current. After a value of the voltage Vx across the resistor Rx is obtained in block 604, a value of the resistor Rx is calculated (as explained above) in block 606. Next, the calculated value of the resistor Rx is compared to a defined threshold value R0 in block 608. For example, the control circuit 310 may include a circuitry such as a comparator and/or the digital controller 218 may include components, software instructions, etc. to compare the value of the resistor Rx and the threshold value R0.

If the value of the resistor Rx is greater than the defined threshold value R0, a communication address is set for the power supply 300 in block 610 based on the calculated value of the resistor Rx in the default technique (e.g., the constant current technique). In such examples, differences between possible sampling voltages (e.g., the voltage Vx values) and differences in calculated resistance Rx values based on these voltages are large. As such, when the resistance Rx value is relatively large (e.g. as compared to the defined threshold value R0), the delta between adjacent resistance Rx values may be large (e.g., relative to other deltas between other adjacent resistance Rx values). In such examples, it may be desirable to operate in a high-resistance low-density region (e.g., high resistance Rx values and a large delta between adjacent resistance Rx values). As a result, addresses corresponding to the resistance Rx values may be set with a high degree of reliability.

However, if the resistor Rx value is relatively small (as compared to defined threshold value R0) and the default technique is employed, differences between possible sampling voltages becomes smaller due to the lower resistance values. As a result, differences in the calculated resistance Rx values become smaller. Additionally, because the resistance Rx value is small, the sampled voltage Vx is small and susceptible to noise. As such, the degree of reliability of setting addresses reduces when in the default technique (e.g., the constant current technique) and the resistor Rx value is small.

If the resistor Rx value is less than or equal to the defined threshold value R0, the control circuit 310 changes to another technique such as the voltage divider technique as explained above. This is shown in block 612. For example, the digital controller 218 may control the switching device Q2 to turn off, thereby causing the switching device Q1 to turn on as explained above.

As shown in FIG. 6, the method 600 includes obtaining (again) the voltage Vx across the resistor Rx in block 614, and calculating (again) the resistor Rx value (as explained above) in block 616. After the resistor Rx value is calculated (e.g., while in the voltage divider technique), a communication address is set for the power supply 300 in block 610 based on the calculated value of the resistor Rx. In such examples, differences in the resistance Rx values may be small (e.g., as compared to in the constant current technique). As such, when the resistance Rx value is relatively small (e.g. as compared to the defined threshold value R0), the delta between adjacent resistance Rx values may be small (e.g., relative to other deltas between other adjacent resistance Rx values). In such cases, it may be desirable to operate in a low-resistance high-density region (e.g., low resistance Rx values and a small delta between adjacent resistance Rx values).

In such examples, the resistor R1 value may be selected to ensure the differences between possible sampling voltages (e.g., the voltage Vx values) is large. In turn, this causes the resolution of the resistor Rx value to increase. This may lead to a high degree of reliability when setting the communication addresses in the voltage divider technique. For example, the resistor R1 value may be higher or lower than the resistor Rx value. However, if the resistor Rx value is large relative to the resistor R1 value, the differences between possible sampling voltages may decrease (and reduce the resolution of the resistor Rx value).

In some examples, the communication address of the power supply 300 and/or communication addresses of other power supplies in the power system may be set based on lookup tables. For example, a lookup table may be stored in the control circuit 310 (e.g., in memory in the digital controller 218, etc.). The lookup table may include different configurable communication addresses corresponding to different values of the resistor Rx. As such, when a value of the resistor Rx is determined (in either technique), the control circuit 310 may set the communication address of the power supply 300 corresponding to that determined value of the resistor Rx.

For example, FIG. 7 illustrates a lookup table 700 including various resistance Rx values and corresponding addresses. When the calculated resistance Rx value is and/or within a defined tolerance of a resistance value in the lookup table 700, a corresponding communication address in the lookup table 700 may be selected for the power supply 300. For example, if the calculated resistance Rx value is (or within a defined tolerance of) 10 kΩ, the corresponding address for the power supply 300 is set to 96. Alternatively, if the calculated resistance Rx value is (or within a defined tolerance of) 158 kΩ, the corresponding address for the power supply 300 is set to 107. In another example, if the calculated resistance Rx value is (or within a defined tolerance of) 56.2 kΩ, the corresponding address for the power supply 300 is set to 102.

As shown in FIG. 7, the resistance Rx values range from 10 kΩ and 232 kΩ. In this particular example, the low-resistance high-density region may be the resistance Rx values 10 kΩ, 15 kΩ, 21 kΩ, 28 kΩ, 35.7 kΩ and 45.3 kΩ, and the high-resistance low-density region may be the resistance Rx values 69.8 kΩ, 88.7 kΩ, 107 kΩ, 130 kΩ, 158 kΩ, 191 kΩ and 232 kΩ. As shown in FIG. 7, the deltas between adjacent resistance Rx values in the low-resistance high-density region are smaller relative to the deltas between adjacent resistance Rx values in the high-resistance low-density region. For instance, the delta between the resistance Rx value 15 kΩ and the resistance Rx value 21 kΩ is 6, and the delta between the resistance Rx value 191 kΩ and the resistance Rx value 232 kΩ is 41, In other example embodiments, a lookup table may include various voltage Vx values and corresponding addresses. The various voltage Vx values may have a defined relationship with the resistance Rx values. As such, For example, the various voltage Vx values may have a linear relationship a with the resistance Rx values if the same amount of current passes through the address-setting resistors coupled to different power supplies. In other examples, the various voltage Vx values may have a nonlinear relationship with the resistance Rx values.

In other examples, if the deltas between adjacent resistance values in a lookup table are substantially similar, a formula may be used to set a communication address of the power supply 300. For example, if a lookup table (e.g. the lookup table 700 of FIG. 7) includes the resistance Rx values 24.9 kΩ, 49.9 kΩ, 75 kΩ and 100 kΩ, the deltas between these adjacent resistance values are each about 25. In such examples, a formula based on the sensed voltage Vx may be used to set the communication address. For instance, the communication address may be set based on the sensed voltage Vx divided by a defined voltage level (e.g., 250 mV, etc.)

By way of example only, and with reference to FIGS. 3-7, the resistor R1 may be 56 kΩ, the resistor R2 may be 30 kΩ, the voltage Vcss may be 10 V, the voltage Vcc may be 3.3 V and the constant output current Io may be 10 μA. In this example, the defined threshold value RO may be a value near (or sometimes at) the median value of the range of resistance Rx values in the table 700. For example, the defined threshold value R0 may be set to a value near 45.3 kΩ, a value ranging from 45.3 kΩ to 56.2 kΩ, etc.

For instance, the defined threshold value RO may be set to 50 kΩ. In such examples, when the control circuit 310 controls the switch devices Q1, Q2 to select the constant current technique (e.g., as a default technique as explained above), the resistor Rx value may be calculating by dividing the sensed voltage Vx by 10 μA (i.e., the constant output current Io). If the calculated resistor Rx value is around 69 kΩ, the control circuit 310 may set its communication address to 103 (based on the table 700 of FIG. 7). However, if the resistor Rx value is determined to be around 25 kΩ (using the constant current technique), the control circuit 310 may control the switch devices Q1, Q2 to select the voltage divider technique (as explained above), sense the voltage Vx, and recalculate the resistor Rx value based on equation (2) above. In such examples, if the recalculated resistor Rx value is around 27.6 kΩ, the control circuit 310 may set its communication address to 99 (based on the table 700 of FIG. 7).

Figure 8:
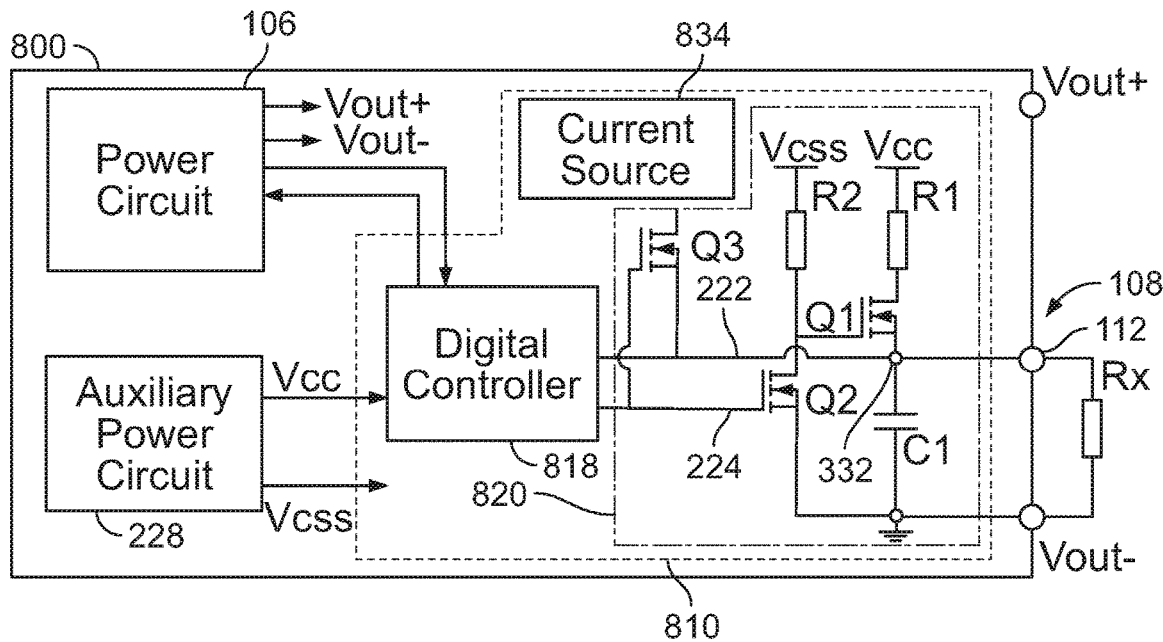
FIG. 8 is a circuit block diagram of a power supply including a control circuit with a current source and a driving circuit for selecting different techniques to set an address of the power supply according to another example embodiment.

As explained above relative to FIG. 3, a constant current may be generated and provided by the digital controller 218. In other embodiments, a circuit external to the digital controller 218 may generate and provide the constant current. For example, FIG. 8 illustrates a switched technique power supply 800 including the power circuit 106 and the communication interface 108 of FIG. 1, the auxiliary power circuit 228 of FIG. 2, and a control circuit 810 having a digital controller 818, a driving circuit 820, and a current source 834. The digital controller 818 is substantially similar to the digital controller 218 of FIG. 3, but does not provide a constant current for determining the value of the resistor Rx. As shown in FIG. 8, the current source 834 may be a component of the control circuit 810 of FIG. 8. In other embodiments, the current source 834 may be located external to the control circuit if desired.

As shown, the driving circuit 820 includes the switching devices Q1, Q2, the resistors R1, R2 and the capacitor C1 of FIG. 3, and another switching device Q3. The switching device Q3 is coupled between the current source 834 and the node 332.

The switching device Q3 is controlled in a similar manner as the switching device Q2. For example, when the control signal 224 is high, the switching device Q2 and the switching device Q3 turn on. During this time, the switching device Q1 is forced off and the current source 834 outputs a constant current (e.g., the signal 222) to the resistor Rx as explained above. This may be referred to a constant current technique. However, when the control signal 224 is low, the switching device Q2 and the switching device Q3 turn off. This causes the switching device Q1 to turn on thereby coupling the resistors R1 and Rx in a voltage divider circuit as explained above. This may be referred to a voltage divider technique.

Figure 9:
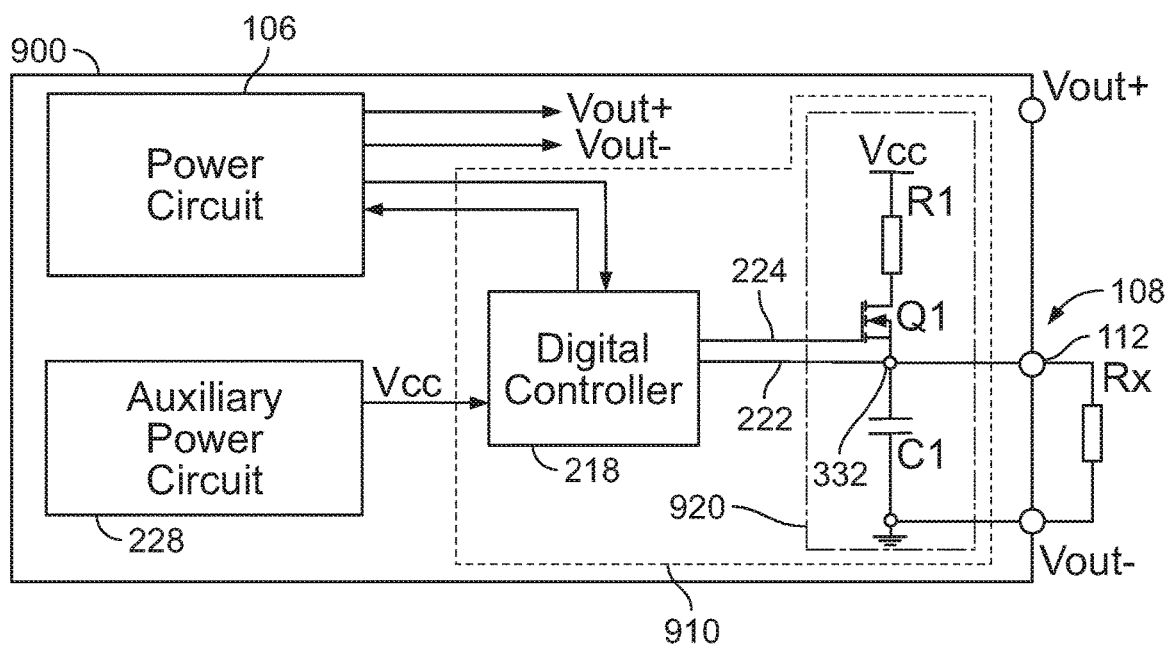
FIG. 9 is a circuit block diagram of a power supply including a control circuit with a driving circuit having one switching device and one resistor for selecting different techniques to set an address of the power supply according to yet another example embodiment.

FIG. 9 illustrates a switched technique power supply 900 including the power circuit 106 and the communication interface 108 of FIG. 1, the auxiliary power circuit 228 of FIG. 2, and a control circuit 910 having the digital controller 218 of FIGS. 2 and 3 and a driving circuit 920. The control circuit 910 of FIG. 9 functions similar to the control circuit 310 of FIG. 3.

As shown in FIG. 9, the driving circuit 920 includes one switching device Q1, one resistor R1, and one capacitor C1. Similar to FIG. 3, the switching device Q1 of FIG. 9 is coupled to the resistor R1 on one side (e.g., the drain) and the capacitor C1 on the other side (e.g., the source). The switching device Q1, the capacitor C1, and the address terminal 112 are coupled together at the node 332.

In operation, the digital controller 218 controls the switching device Q1 to select between different techniques for setting a communication address of the power supply 900. For example, the control circuit 910 may operate in one technique (e.g., a constant current technique) by controlling the switching device Q1 to turn off. This causes the resistor R1 to disconnect from the node 332. During this time, the digital controller 218 may provide a constant current (e.g., the signal 222) to the resistor Rx as explained above. This may occur after a startup of the power supply 900 and/or when the value of the resistor Rx is greater than a defined threshold value.

Alternatively, the control circuit 910 may operate in another technique (e.g., a voltage divider technique) by controlling the switching device Q1 to turn on. For example, the digital controller 218 may force the control signal 224 high to turn on the switching device Q1. In turn, the resistor R1 couples to the resistor Rx to form a voltage divider circuit as explained above. This may occur when the value of the resistor Rx is less than or equal to the defined threshold value.

Figure 10:
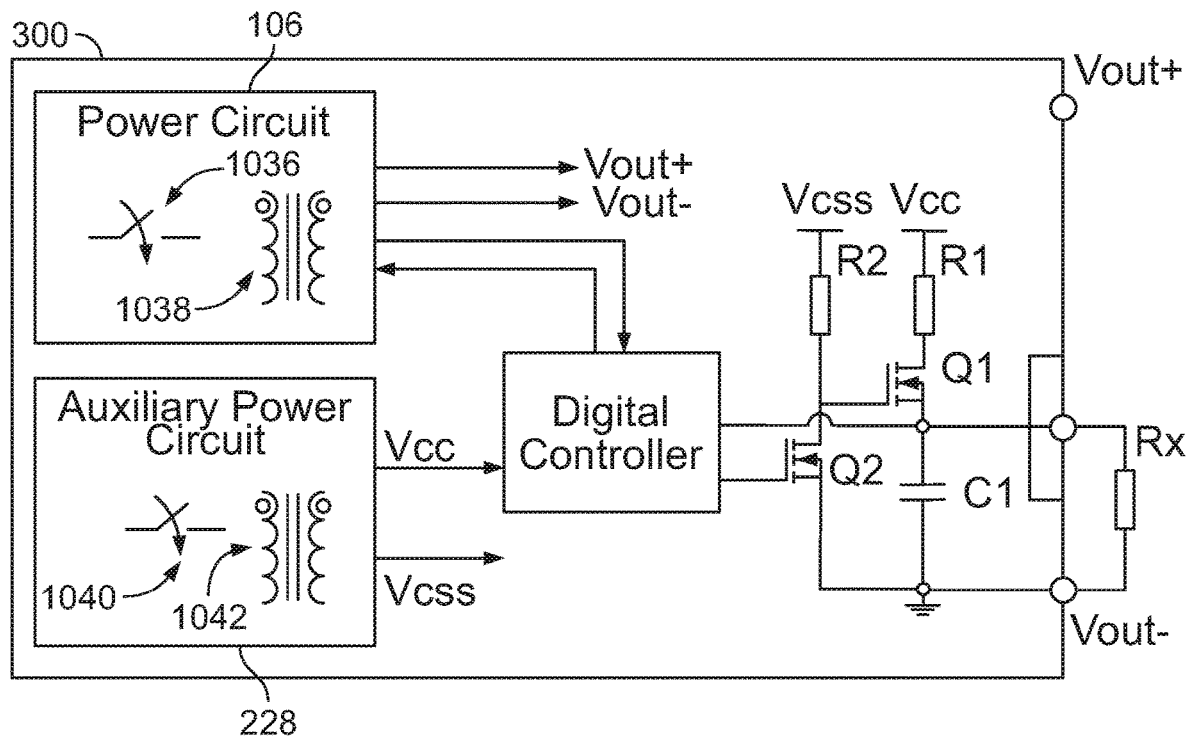
FIG. 10 is a circuit block diagram of the power supply of FIG. 3, where the power supply includes power circuits each having one or more power switches and transformers according to another example embodiment.

The power circuits disclosed herein may include any suitable topology such as a buck, boost, buck-boost, etc. topology. Additionally, the power circuits may include a single converter stage or multiple converter stages, and provide AC/DC, DC/AC and/or DC/DC power conversion. In some embodiments, the power circuits may include one or more power switches, isolation components, resistors, capacitors, inductors, etc. For example, FIG. 10 illustrates the switched mode power supply 300 of FIG. 3 but with the power circuit 106 including a power switch 1036 and a transformer 1038 and the auxiliary power circuit 228 including a power switch 1040 and a transformer 1042.

Figure 11:
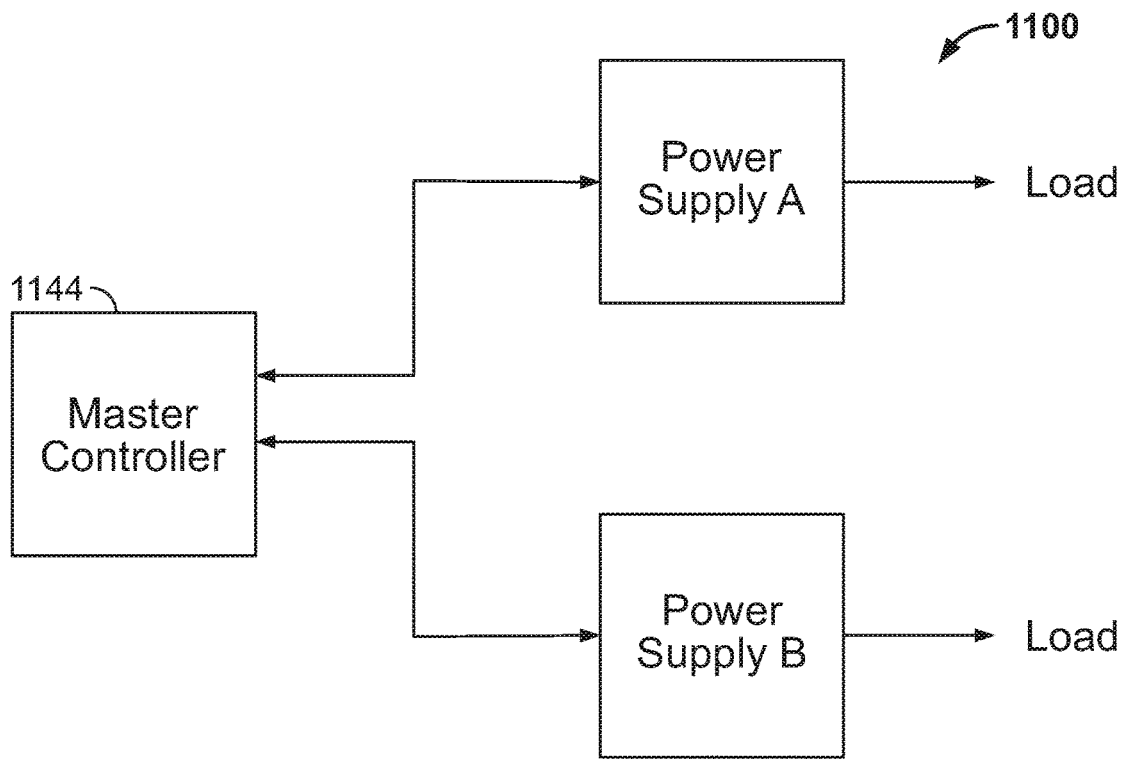
FIG. 11 is a block diagram of a power system including two power supplies each having configuration communication addresses, and a master controller in communication with the power supplies according to yet another example embodiment.

In some examples, one or more of the power supplies disclosed herein may be part of a power system. For example, FIG. 11 illustrates a power system 1100 including two power supplies A, B and a master controller 1144. The power supplies A, B may provide power to one or more loads. The master controller 1144 and the power supplies A, B may have a master/slave relationship.

Each of the power supplies A, B may be any suitable power supply, including any one of the power supplies disclosed herein. For example, each power supply A, B may include a communication address, as set by any one or more of the examples disclosed herein. As such, the master controller 1144 may communicate with each of the power supplies A, B based on set communication addresses. For example, the master controller 1144 may receive signals representing electrical parameters of the power supplies A, B, and provide control signals to the power supplies A, B (e.g., to control circuits in the power supplies A, B).

The control circuits and/or the master controllers disclosed herein may include an analog control circuit, a digital control circuit (e.g., a digital signal controller (DSC), a digital signal processor (DSP), a microcontroller unit (MCU), a field-programmable gate array (FPGA), an application-specific IC (ASIC), etc.), or a hybrid control circuit (e.g., a digital control unit and an analog circuit). For example, the control circuits and/or the master controllers may include digital control circuitry such as the digital controller disclosed herein and/or analog control circuitry such as the driving circuits disclosed herein. Additionally, the entire control circuit/master controller, some of the control circuit/master controller, or none of the control circuit/master controller may be positioned on an integrated circuit. In some instances, the digital controllers disclosed herein may be integrated chips.

In some examples, the control circuits may communicate with the master controllers via a Power Management Bus (PMBus) protocol or another suitable protocol.

The switching devices and/or power switches disclosed herein may include field-effect transistors (FETs) such as MOSFETs, and/or other suitable devices. For example, the switching devices Q1, Q2, Q3 of FIGS. 3 and 8-10 are shown as nMOSFETs. However, other suitable switching devices may be employed if desired.

The terminals disclosed herein may include an electrical contact, a wire, a lead, a pin and/or another suitable terminal. As explained above, the communication interfaces disclosed herein may include one or more address terminals. In some examples, the communication interfaces may include only one address terminal for coupling to the resistor Rx.

By employing one or more features disclosed herein, users may set communication addresses of power supplies with a high degree of reliability as explained above. Additionally, the cost of implementing the features is low. For example, the features of the driving circuits may be implemented with low cost and low complexity components such as one or more resistors, capacitors, switching devices, etc. As such component, production, manufacturing, etc. costs may be minimal.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switched mode power supply for communicating with a master controller of a power system, the switched mode power supply comprising:
   an input;
   an output;
   a power circuit coupled between the input and the output;
   a communication interface including an address terminal configured to couple to an external resistor for setting a communication address of the switched mode power supply when the external resistor is coupled to the address terminal; and
   a control circuit coupled to the power circuit and the communication interface, the control circuit configured to:
      set the communication address of the switched mode power supply using a first technique based on a value of the external resistor being greater than a threshold value;
      set the communication address of the switched mode power supply using a second technique based on the value of the external resistor being less than the threshold value;
      determine the value of the external resistor a first time with the first technique;
      compare the first determined value of the external resistor with the threshold value; and
      based on the first determined value of the external resistor being less than the threshold value, determine the value of the external resistor a second time using the second technique and set the communication address based on the second determined value of the external resistor;
   wherein the control circuit does not determine the value of the external resistor the second time using the second technique based on the first determined value of the external resistor being greater than the threshold value.

2. The switched mode power supply of claim 1 wherein the control circuit is configured to determine whether the value of the external resistor is greater than or less than the threshold value.

3. The switched mode power supply of claim 2 wherein the control circuit is configured to set the communication address of the switched mode power supply using the determined value of the external resistor.

4. The switched mode power supply of claim 1 wherein the control circuit is configured to set the communication address using the second determined value of the external resistor.

5. The switched mode power supply of claim 1 wherein the control circuit includes a switching device controllable to select the first technique or the second technique to set the communication address of the switched mode power supply.

6. The switched mode power supply of claim 5 wherein the control circuit includes a resistor for forming a voltage divider circuit with the external resistor when the external resistor is coupled to the address terminal.

7. The switched mode power supply of claim 6 wherein the switching device is a first switching device: and
   wherein the control circuit includes a second switching device for coupling the external resistor and the resistor of the control circuit to form the voltage divider circuit when the first switching device is off and the external resistor is coupled to the address terminal.

8. The switched mode power supply of claim 7 wherein the second switching device is controlled based on the state of the first switching device.

9. The switched mode power supply of claim 6 wherein, when the switching device is on and the external resistor is coupled to the address terminal, the control circuit is configured to:
   output a constant current to the external resistor; and
   determine the value of the external resistor based on a sensed voltage across the external resistor.

10. A power system comprising a master controller and a plurality of power supplies including the switched mode power supply of claim 1.

11. The power system of claim 10 wherein the master controller is configured to communicate with said switched mode power supply via a Power Management Bus (PMBus) protocol.

12. A method for setting a communication address of a switched mode power supply for communicating with a master controller, the switched mode power supply including a communication interface having at least one address terminal coupled to an external resistor, the method comprising:
   setting the communication address of the switched mode power supply with a first technique based on a value of the external resistor being greater than a threshold value; and
   setting the communication address of the switched mode power supply with a second technique based on the value of the external resistor being less than the threshold value;
   determining the value of the external resistor a first time with the first technique;
   comparing the first determined value of the external resistor with the threshold value; and
   based on the first determined value of the external resistor being less than the threshold value, determining the value of the external resistor a second time with the second technique and setting the communication address based on the second determined value of the external resistor;

wherein the value of the external resistor is not determined the second time using the second technique based on the first determined value of the external resistor being greater than the threshold value.

13. The method of claim 12 wherein setting the communication address of the switched mode power supply includes controlling a switching device in the switched mode power supply to turn on after start-up of the switched mode power supply.

14. A switched mode power supply comprising:
a communication interface; and
an address terminal for setting a communication address for the switched mode power supply using the resistance of an external resistor when the external resistor is coupled to the address terminal;
wherein the switched mode power supply is configured to:
determine a first resistance value for the external resistor using a first technique;
determine a second resistance value for the external resistor using a second technique;
set the communication address of the switched mode power supply using the first resistance value based on the first resistance value being greater than a threshold value; and
set the communication address of the switched mode power supply using the second resistance value based on the first resistance value being less than the threshold value;
wherein the switched mode power supply does not determine the second resistance value for the external resistor using the second technique based on the first resistance value for the external resistor being greater than the threshold value.

* * * * *